United States Patent
Yang

(10) Patent No.: US 10,982,088 B2
(45) Date of Patent: Apr. 20, 2021

(54) POLYMER COMPOSITION COMPRISING POLY(BUTYLENE TEREPHTHALATE)

(71) Applicant: SABIC GLOBAL TECHNOLOGIES B.V., Bergen Op Zoom (NL)

(72) Inventor: Yuzhen Yang, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 7 days.

(21) Appl. No.: 16/337,070

(22) PCT Filed: Sep. 26, 2017

(86) PCT No.: PCT/EP2017/074277
§ 371 (c)(1),
(2) Date: Mar. 27, 2019

(87) PCT Pub. No.: WO2018/060155
PCT Pub. Date: Apr. 5, 2018

(65) Prior Publication Data
US 2020/0032048 A1     Jan. 30, 2020

(30) Foreign Application Priority Data
Sep. 30, 2016 (EP) .................................. 16191659

(51) Int. Cl.
*C08L 67/02* (2006.01)
*B60K 15/03* (2006.01)

(52) U.S. Cl.
CPC ........ *C08L 67/02* (2013.01); *B60K 15/03177* (2013.01); *B60K 2015/03493* (2013.01); *C08L 2205/025* (2013.01); *C08L 2205/03* (2013.01)

(58) Field of Classification Search
CPC .......... C08L 25/10; C08L 25/12; C08L 51/04; C08L 51/06; C08L 67/02
See application file for complete search history.

(56) References Cited

U.S. PATENT DOCUMENTS

| | | | |
|---|---|---|---|
| 7,022,768 B1 * | 4/2006 | Lacroix | C08L 67/02 525/166 |
| 8,791,189 B2 | 7/2014 | Agarwal et al. | |
| 2007/0049667 A1 | 3/2007 | Kim et al. | |
| 2008/0090965 A1 | 4/2008 | Kim | |
| 2009/0181199 A1 | 7/2009 | Agarwal et al. | |
| 2013/0137797 A1 | 5/2013 | Onda | |

FOREIGN PATENT DOCUMENTS

| | | |
|---|---|---|
| CN | 104479353 A * | 4/2015 |
| CN | 105400161 A | 3/2016 |
| EP | 0573680 A1 | 12/1993 |

OTHER PUBLICATIONS

CN 104479353 A—machine translation (Apr. 2015).*
CN 105400161 A—machine translation (Mar. 2016).*
International Search Report and Written Opinion for International Application No. PCT/EP2017/074277, International Filing Date Sep. 26, 2017, dated Dec. 20, 2017, 12 pages.

* cited by examiner

*Primary Examiner* — Ana L. Woodward
(74) *Attorney, Agent, or Firm* — Cantor Colburn LLP

(57) ABSTRACT

The present invention relates to a polymer composition comprising: (a) poly(butylene terephthalate); (b) glass fibres; (c) a polymer comprising moieties derived from acrylonitrile, butadiene and styrene; and (d) a polymer comprising moieties derived from ethylene, methyl (meth) acrylate and glycidyl (meth)acrylate. Such polymer composition provides a desired balance of chemical resistance, impact strength and tensile strength.

20 Claims, No Drawings

POLYMER COMPOSITION COMPRISING POLY(BUTYLENE TEREPHTHALATE)

CROSS REFERENCE TO RELATED APPLICATIONS

This application is a National Stage application of PCT/EP2017/074277, filed Sep. 26, 2017, which claims the benefit of European Application No. 16191659.8, filed Sep. 30, 2016, both of which are incorporated by reference in their entirety herein.

The present invention relates to a polymer composition comprising poly(butylene terephthalate). The invention also relates to articles comprising such composition. The invention further relates to the use of such articles in automotive applications.

Polymer compositions comprising poly(butylene terephthalates) are well known materials used as engineering thermoplastics. For example in the automotive industry, such polymer compositions find use in a wide variety of applications, such as for example in a range of injection moulded articles. Polymer compositions comprising poly(butylene terephthalates) have multiple desirable properties rendering them particularly useful for the production of such articles, including but not limiting to good dimensional stability in injection moulding, good heat resistance, and good wear resistance.

For certain applications, however, the properties of the polymer compositions comprising poly(butylene terephthalate) according to the state of the art are not sufficient. An example of such relates to use of the polymer compositions in articles that are exposed to chemicals, such as fuels. Examples of such articles are parts of automotive fuel systems, including valves and ports used in fuel tanks, in-tank electrical connectors, and tube clips. The materials that are suitable for use in such articles need to demonstrate, in addition to the above mentioned properties, a variety of further properties including high impact strength and good chemical resistance.

The poly(butylene terephthalate) compositions according to the state of the art do not provide such desired balance of properties. For example, U.S. Pat. No. 8,791,189 presents polymer compositions comprising poly(butylene terephthalate). However, the polymer compositions according to this document do not demonstrate a desired balance of impact strength, tensile strength in combination with chemical resistance.

Thus, a need remains for polymer compositions comprising poly(butylene terephthalate) having such desired balance of impact strength, tensile strength and chemical resistance. This has now been achieved according to the invention by a polymer composition comprising:
  (a) poly(butylene terephthalate);
  (b) glass fibres;
  (c) a polymer comprising moieties derived from acrylonitrile, butadiene and styrene; and
  (d) a polymer comprising moieties derived from ethylene, methyl (meth)acrylate and glycidyl (meth)acrylate.

Such polymer composition demonstrates a desired balance of chemical resistance, impact strength and tensile strength.

The poly(butylene terephthalate) that is used in the polymer composition according to the present invention may for example be a polymer comprising polymeric units derived from terephthalic acid or a diester thereof such as dimethyl terephthalate, and polymeric units derived from a butanediol, such as 1,4-butanediol.

The poly(butylene terephthalate) may further comprise polymeric units derived from other monomers, such as isophthalic acid. For example, the poly(butylene terephthalate) may comprise up to 10.0 wt % of polymeric units derived from isophthalic acid. Preferably, the poly(butylene terephthalate) comprises up to 5.0 wt % of units derived from isophthalic acid, such as 1.0-4.0 wt %.

Alternatively, the poly(butylene terephthalate) may be a homopolymer comprising units derived from terephthalic acid or a diester thereof, such as dimethyl terephthalate The poly(butylene terephthalate) may for example have an intrinsic viscosity of ≥0.50 dl/g, alternatively ≥0.80 dl/g. The poly(butylene terephthalate) may for example have an intrinsic viscosity of ≤2.50 dl/g, alternatively ≤2.00 dl/g. It is preferred that the poly(butylene terephthalate) has an intrinsic viscosity of ≥0.50 dl/g ands ≤2.50 dl/g, more preferably ≥0.80 dl/g and ≤2.00 dl/g. The intrinsic viscosity may for example be determined in accordance with ASTM D2857-95 (2007).

The poly(butylene terephthalate may for example have a carboxylic end group content of 10-80 mmol/kg, preferably 20-60 mmol/kg, more preferably 20-40 mmol/kg. The carboxylic end group content may for example be determined in accordance with ASTM D7409-15.

In a further particular embodiment, the poly(butylene terephthalate) may comprise different poly(butylene terephthalates) having different product properties. For example, the poly(butylene terephthalate) may comprise a first poly(butylene terephthalate) and a second poly(butylene terephthalate). The poly(butylene terephthalate) may for example be a blend of such first poly(butylene terephthalate) and such second poly(butylene terephthalate). Such blend may be obtained by melt mixing of a mixture comprising the first poly(butylene terephthalate) and the second poly(butylene terephthalate). Alternatively, such blend may be obtained by mixing granules or powder particles of the first poly(butylene terephthalate) and the second poly(butylene terephthalate) in the solid state.

The first poly(butylene terephthalate) may for example have an intrinsic viscosity of 0.50-1.00 dl/g, alternatively 0.70-0.80 dl/g. The second poly(butylene terephthalate) may for example have an intrinsic viscosity of 1.00-1.50 dl/g, alternatively 1.15-1.40 dl/g. Preferably, the first poly(butylene terephthalate) has an intrinsic viscosity of 0.50-1.00 dl/g and the second poly(butylene terephthalate) has an intrinsic viscosity of 1.00-1.50 dl/g. More preferably, the first poly(butylene terephthalate) has an intrinsic viscosity of 0.70-0.80 dl/g and the second poly(butylene terephthalate) has an intrinsic viscosity of 1.15-1.40 dl/g.

The use of such blend of such first poly(butylene terephthalate) and such second poly(butylene terephthalate) allows for the preparation of blends having a desired intrinsic viscosity of the blend.

The poly(butylene terephthalate) may for example comprise ≥20.0 wt % of a poly(butylene terephthalate) having an intrinsic viscosity of 0.50-1.00 dl/g, alternatively 0.70-0.80 dl/g. Preferably, the poly(butylene terephthalate) comprises ≥30.0 wt % of a poly(butylene terephthalate) having an intrinsic viscosity of 0.50-1.00 dl/g, alternatively 0.70-0.80 dl/g. Even more preferably, the poly(butylene terephthalate) comprises ≥40.0 wt % of a poly(butylene terephthalate) having an intrinsic viscosity of 0.50-1.00 dl/g, alternatively 0.70-0.80 dl/g.

The poly(butylene terephthalate) may for example comprise ≤80.0 wt % of a poly(butylene terephthalate) having an intrinsic viscosity of 0.50-1.00 dl/g, alternatively 0.70-0.80 dl/g. Preferably, the poly(butylene terephthalate) comprises ≤70.0 wt % of a poly(butylene terephthalate) having an intrinsic viscosity of 0.50-1.00 dl/g, alternatively 0.70-0.80 dl/g. Even more preferably, the poly(butylene terephthalate) comprises ≤60.0 wt % of a poly(butylene terephthalate) having an intrinsic viscosity of 0.50-1.00 dl/g, alternatively 0.70-0.80 dl/g.

The poly(butylene terephthalate) may for example comprise ≥20.0 wt % of a poly(butylene terephthalate) having an intrinsic viscosity of 1.00-1.50 dl/g, alternatively 1.15-1.40 dl/g. Preferably, the poly(butylene terephthalate) comprises ≥30.0 wt % of a poly(butylene terephthalate) having an intrinsic viscosity of 1.00-1.50 dl/g, alternatively 1.15-1.40 dl/g. Even more preferably, the poly(butylene terephthalate) comprises ≥40.0 wt % of a poly(butylene terephthalate) having an intrinsic viscosity of 1.00-1.50 dl/g, alternatively 1.15-1.40 dl/g.

The poly(butylene terephthalate) may for example comprise ≤80.0 wt % of a poly(butylene terephthalate) having an intrinsic viscosity of 1.00-1.50 dl/g, alternatively 1.15-1.40 dl/g. Preferably, the poly(butylene terephthalate) comprises ≤70.0 wt % of a poly(butylene terephthalate) having an intrinsic viscosity of 1.00-1.50 dl/g, alternatively 1.15-1.40 dl/g. Even more preferably, the poly(butylene terephthalate) comprises ≤60.0 wt % of a poly(butylene terephthalate) having an intrinsic viscosity of 1.00-1.50 dl/g, alternatively 1.15-1.40 dl/g.

For example, the poly(butylene terephthalate) may comprise ≥20.0 wt % and ≤80.0 wt % of a poly(butylene terephthalate) having an intrinsic viscosity of 0.50-1.00 dl/g, alternatively 0.70-0.80 dl/g. Preferably, the poly(butylene terephthalate) comprises ≥30.0 wt % and ≤70.0 wt % of a poly(butylene terephthalate) having an intrinsic viscosity of 0.50-1.00 dl/g, alternatively 0.70-0.80 dl/g. Even more preferably, the poly(butylene terephthalate) comprises ≥40.0 wt % and ≤60 wt % of a poly(butylene terephthalate) having an intrinsic viscosity of 0.50-1.00 dl/g, alternatively 0.70-0.80 dl/g.

For example, the poly(butylene terephthalate) may comprise ≥20.0 wt % and ≤80.0 wt % of a poly(butylene terephthalate) having an intrinsic viscosity of 1.00-1.50 dl/g, alternatively 1.15-1.40 dl/g. Preferably, the poly(butylene terephthalate) comprises ≥30.0 wt % and ≤70.0 wt % of a poly(butylene terephthalate) having an intrinsic viscosity of 1.00-1.50 dl/g, alternatively 1.15-1.40 dl/g. Even more preferably, the poly(butylene terephthalate) comprises ≥40.0 wt % and ≤60 wt % of a poly(butylene terephthalate) having an intrinsic viscosity of 1.00-1.50 dl/g, alternatively 1.15-1.40 dl/g.

Particularly preferable, the poly(butylene terephthalate) may comprise ≥20.0 wt % and ≤80.0 wt % of a poly(butylene terephthalate) having an intrinsic viscosity of 0.50-1.00 dl/g and ≥20.0 wt % and ≤80.0 wt % of a poly(butylene terephthalate) having an intrinsic viscosity of 1.00-1.50 dl/g. Further preferably, the poly(butylene terephthalate) may comprise ≥30.0 wt % and ≤70.0 wt % of a poly(butylene terephthalate) having an intrinsic viscosity of 0.50-1.00 dl/g and ≥30.0 wt % and ≤70.0 wt % of a poly(butylene terephthalate) having an intrinsic viscosity of 1.00-1.50 dl/g. Even further preferably, the poly(butylene terephthalate) may comprise ≥40.0 wt % and ≤60.0 wt % of a poly(butylene terephthalate) having an intrinsic viscosity of 0.50-1.00 dl/g and ≥40.0 wt % and ≤60.0 wt % of a poly(butylene terephthalate) having an intrinsic viscosity of 1.00-1.50 dl/g.

The glass fibres may for example be glass fibres having an average diameter of 6.0-20.0 μm. Preferably, the glass fibres have an average diameter of 10.0-15.0 μm. It is preferred that the glass fibres used in the production of the polymer compositions according to the present invention have an average length of 3.0-15.0 mm. More preferably, the glass fibres use in the production of the polymer composition according to the present invention have an average length of 5.0-10.0 mm.

The glass fibres may for example comprise lime-alumino-borosilicate glass. The glass fibres may be treated with coupling agents to improve adhesion to the polymer matrix. Such coupling agents may for example be amino-, epoxy-, amido-, or mercapto-functionalised silanes. Alternatively, the coupling agents may be titanium- or zirconium-based compounds.

The glass fibres may be understood to contribute to the good heat deflection temperature and the good modulus of elasticity of the polymer composition according to the present invention.

The polymer (c) as used in the polymer composition according to the invention is a polymer comprising moieties derived from acrylonitrile, butadiene and styrene. For example, the polymer (c) may be a graft copolymer comprising poly(butadiene) onto which acrylonitrile and styrene are grafted. For example, the polymer (c) may be a polymer produced via reaction of poly(butadiene) particles with acrylonitrile and styrene. Such reaction may for example be an emulsion polymerisation.

The polymer (c) may for example comprise ≥50.0 wt % of units derived from butadiene. Preferably, polymer (c) comprises ≥55.0 wt % of units derived from butadiene. More preferably, polymer (c) comprises ≥60.0 wt % of units derived from butadiene. Particularly desirable is an embodiment where polymer (c) comprises ≥50.0 and ≤80.0 wt % of units derived from butadiene, even more particularly ≥60.0 wt % and ≤75.0 wt %, with regard to the total weight of polymer (c). The use of such polymer (c) contributes to the desired good impact strength in the polymer composition according to the present invention.

The polymer (c) may comprise a fraction of units derived from styrene and from acrylonitrile that are grafted onto the poly(butadiene). Further the polymer (c) may comprise a fraction of units derived from styrene and acrylonitrile that are not bound to the poly(butadiene). Such units may form a styrene-acrylonitrile (SAN) phase. The polymer (c) may for example comprise a SAN phase of ≤20.0 wt %, preferably ≤15.0 wt %, with regard to the total weight of the polymer (c). More preferably, the polymer (c) may comprise ≥5.0 and ≤20.0 wt % of SAN phase with regard to the total weight of the polymer (c), even more preferably ≥10.0 wt % and ≤15.0 wt %.

The polymer (c) that is used in the polymer composition of the present invention may for example have an average particle size of ≤500 nm, such as ≥200 and ≤500 nm, more preferably ≥200 nm and ≤300 nm. Such average particle size may contribute to the increase in impact strength of the polymer composition. The average particle size may for example be determined as the particle size $D_{50}$ as determined in accordance with ISO 9276-2 (2014).

The polymer (c) may further comprise a fraction of polymer units derived from other monomers. For example, polymer (c) may further comprise a fraction of polymer units derived from methyl (meth)acrylate. Preferably, polymer (c) comprises ≤5.0 wt % of polymeric units derived from methyl (meth)acrylate. More preferably, polymer (c) comprises ≤1.0 and ≤4.0 wt % of polymer units derived from methyl (meth)acrylate, with regard to the total weight of the polymer (c).

The polymer (d) as used in the polymer composition according to the invention is a polymer comprising moieties derived from ethylene, methyl (meth)acrylate and glycidyl (meth)acrylate. Preferably, polymer (d) comprises moieties derived from ethylene, methyl acrylate and glycidyl methacrylate. Polymer (d) may for example comprise ≤10.0 wt %, preferably ≥15.0 wt %, of moieties derived from methyl (meth)acrylate, with regard to the total weight of polymer (d). Polymer (d) may for example comprise ≤40.0 wt %, preferably ≤30.0 wt %, of moieties derived from methyl (meth)acrylate, with regard to the total weight of polymer (d). Polymer (d) may for example comprise ≥10.0 wt %, preferably ≥15.0 wt %, of moieties derived from methyl acrylate, with regard to the total weight of polymer (d). Polymer (d) may for example comprise ≤40.0 wt %, preferably ≤30.0 wt %, of moieties derived from methyl acrylate, with regard to the total weight of polymer (d).

Preferably, polymer (d) comprises ≥10.0 wt % and ≤40.0 wt % of moieties derived from methyl (meth)acrylate. More preferably, polymer (d) comprises ≥15.0 wt % and ≤30.0 wt % of moieties derived from methyl (meth)acrylate.

Preferably, polymer (d) comprises ≥10.0 wt % and ≤40.0 wt % of moieties derived from methyl acrylate. More preferably, polymer (d) comprises ≥15.0 wt % and ≤30.0 wt % of moieties derived from methyl acrylate, with regard to the total weight of polymer (d).

Polymer (d) may for example comprise ≤15.0 wt %, preferably ≤10.0 wt %, of moieties derived from glycidyl (meth)acrylate, with regard to the total weight of polymer (d). Polymer (d) may comprise ≥1.0 wt %, preferably ≥5.0 wt %, of moieties derived from glycidyl (meth)acrylate, with regard to the total weight of polymer (d). Preferably, polymer (d) comprises ≥1.0 wt % and ≤15.0 wt % of moieties derived from glycidyl (meth)acrylate, with regard to the total weight of polymer(d). More preferably, polymer (d) comprises ≥5.0 wt % and ≤10.0 wt % of moieties derived from glycidyl (meth)acrylate, with regard to the total weight of polymer (d).

Polymer (d) may for example comprise ≤15.0 wt %, preferably ≤10.0 wt %, of moieties derived from glycidyl methacrylate, with regard to the total weight of polymer (d). Polymer (d) may comprise ≥1.0 wt %, preferably ≥5.0 wt %, of moieties derived from glycidyl methacrylate, with regard to the total weight of polymer (d). Preferably, polymer (d) comprises ≥1.0 wt % and ≤15.0 wt % of moieties derived from glycidyl methacrylate, with regard to the total weight of polymer(d). More preferably, polymer (d) comprises ≥5.0 wt % and ≤10.0 wt % of moieties derived from glycidyl methacrylate, with regard to the total weight of polymer (d).

It is particularly preferred that polymer (d) comprises comprises ≥10.0 wt % and ≤40.0 wt % of moieties derived from methyl acrylate and ≥1.0 wt % and ≤15.0 wt % of moieties derived from glycidyl methacrylate, with regard to the total weight of polymer (d). Even more particularly is it preferred that polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

The use of such polymer (d) may be understood to contribute to the desired good chemical resistance and the good impact strength of the polymer composition of the present invention by formation of chemical bonds between the polymer (d) and the poly(butylene terephthalate).

The polymer composition may further comprise stabilisers as are known in the art. Such stabilisers include antioxidants, UV stabilisers and heat stabilisers.

The polymer composition may for example comprise ≤85.0 wt %, preferably ≤80.0 wt %, more preferably ≤75.0 wt %, even more preferably ≤70.0 wt %, even more preferably ≤60.0 wt % of poly(butylene terephthalate), with regard to the total weight of the polymer composition.

The polymer composition may for example comprise ≥40.0 wt %, preferably ≥50.0 wt %, more preferably ≥60.0 wt % of poly(butylene terephthalate), with regard to the total weight of the polymer composition.

The polymer composition may for example comprise ≥40.0 and ≤85.0 wt %, preferably 40.0 and ≤75.0 wt %, more preferably ≥40.0 and ≤70.0 wt %, even more preferably ≥40.0 and ≤60.0 wt %, even more preferably ≥50.0 and ≤60.0 wt % of poly(butylene terephthalate), with regard to the total weight of the polymer composition.

The polymer composition may for example comprise ≥1.0 wt %, preferably ≥5.0 wt %, more preferably ≥10.0 wt %, of glass fibres, with regard to the total weight of the polymer composition.

The polymer composition may for example comprise ≤25.0 wt %, preferably ≤20.0 wt %, more preferably ≤15.0 wt %, of glass fibres, with regard to the total weight of the polymer composition.

The polymer composition may for example comprise ≥1.0 and ≤25.0 wt %, preferably ≥5.0 and ≤25.0 wt %, more preferably ≥5.0 and ≤20.0 wt %, even more preferably ≥10.0 and ≤20.0 wt %, even more preferably ≥5.0 and ≤15.0 wt %, of glass fibres, with regard to the total weight of the polymer composition.

The polymer composition may for example comprise ≥5.0 wt %, preferably ≥10.0 wt %, more preferably ≥15.0 wt %, even more preferably ≥20.0 wt %, of polymer (c), with regard to the total weight of the polymer composition.

The polymer composition may for example comprise ≤50.0 wt %, preferably ≤40.0 wt %, more preferably ≤30.0 wt %, even more preferably ≤25.0 wt %, of polymer (c), with regard to the total weight of the polymer composition.

The polymer composition may for example comprise ≥5.0 and ≤50.0 wt %, preferably ≥10.0 and ≤40.0 wt %, more preferably ≥10.0 and ≤30.0 wt %, even more preferably ≥10.0 and ≤25.0 wt %, of polymer (c), with regard to the total weight of the polymer composition.

The polymer composition may for example comprise ≥1.0 wt %, preferably 3.0 wt %, more preferably ≥5.0 wt % of polymer (d), with regard to the total weight of the polymer composition.

The polymer composition may for example comprise ≤20.0 wt %, preferably ≤15.0 wt %, more preferably ≤10.0 wt %, even more preferably ≤5.0 wt %, of polymer (d), with regard to the total weight of the polymer composition.

The polymer composition may for example comprise ≥1.0 and ≤20.0 wt %, preferably ≥1.0 and ≤15.0 wt %, more preferably ≥1.0 and ≤10.0 wt %, even more preferably ≥3.0 and ≤10.0 wt %, of polymer (d), with regard to the total weight of the polymer composition.

The polymer composition may for example comprise ≤25.0 wt %, preferably ≤20.0 wt %, more preferably ≤15.0 wt %, of glass fibres, and ≥5.0 and ≤50.0 wt %, of polymer (c), with regard to the total weight of the polymer composition.

Preferably, the polymer composition comprises ≥5.0 and ≤25.0 wt % of glass fibres, and ≥10.0 and ≤30.0 wt %, of polymer (c), with regard to the total weight of the polymer composition. More preferably, the polymer composition comprises ≥5.0 and ≤20.0 wt % of glass fibres, and ≥10.0 and ≤30.0 wt %, of polymer (c), with regard to the total weight of the polymer composition.

Even more preferably, the polymer composition comprises ≥5.0 and ≤20.0 wt % of glass fibres, and ≥10.0 and ≤25.0 wt %, of polymer (c), with regard to the total weight of the polymer composition.

The polymer composition may for example comprise ≥5.0 and ≤50.0 wt % of polymer (c) and ≥1.0 and ≤20.0 wt % of polymer (d), with regard to the total weight of the polymer composition.

Preferably, the polymer composition comprises ≥10.0 and ≤30.0 wt % of polymer (c) and ≥1.0 and ≤20.0 wt % of polymer (d), with regard to the total weight of the polymer composition.

More preferably, the polymer composition comprises ≥10.0 and ≤30.0 wt % of polymer (c) and ≥1.0 and ≤10.0 wt % of polymer (d), with regard to the total weight of the polymer composition.

Even more preferably, the polymer composition comprises ≥10.0 and ≤25.0 wt % of polymer (c) and ≥1.0 and ≤10.0 wt % of polymer (d), with regard to the total weight of the polymer composition.

Even more preferably, the polymer composition comprises ≥10.0 and ≤25.0 wt % of polymer (c) and ≥3.0 and ≤10.0 wt % of polymer (d), with regard to the total weight of the polymer composition.

The polymer composition may for example comprise ≥40.0 and ≤85.0 wt % of ply(butylene terephthalate, ≥5.0 and ≤50.0 wt % of polymer (c) and ≥1.0 and ≤20.0 wt % of polymer (d), with regard to the total weight of the polymer composition.

Preferably, the polymer composition comprises ≥40.0 and ≤70.0 wt % of ply(butylene terephthalate, ≥10.0 and ≤30.0 wt % of polymer (c) and ≥1.0 and ≤20.0 wt % of polymer (d), with regard to the total weight of the polymer composition.

More preferably, the polymer composition comprises ≥40.0 and ≤70.0 wt % of ply(butylene terephthalate, ≥10.0 and ≤25.0 wt % of polymer (c) and ≥1.0 and ≤10.0 wt % of polymer (d), with regard to the total weight of the polymer composition.

In a particularly preferred embodiment, the present invention relates to a polymer composition comprising:
(a) 40.0-70.0 wt % of poly(butylene terephthalate);
(b) 5.0-25.0 wt % of glass fibres;
(c) 10.0-25.0 wt % of a polymer comprising moieties derived from acrylonitrile, butadiene and styrene; and
(d) 1.0-10.0 wt % of a polymer comprising moieties derived from ethylene, methyl (meth)acrylate and glycidyl (meth)acrylate
with regard to the total weight of the polymer composition.

In another particularly preferred embodiment, the present invention relates to a polymer composition comprising:
(e) 40.0-70.0 wt % of poly(butylene terephthalate);
(f) 5.0-25.0 wt % of glass fibres;
(g) 10.0-25.0 wt % of a polymer comprising moieties derived from acrylonitrile, butadiene and styrene; and
(h) 1.0-10.0 wt % of a polymer comprising moieties derived from ethylene, methyl (meth)acrylate and glycidyl (meth)acrylate
with regard to the total weight of the polymer composition;
wherein
polymer (c) comprises ≥60.0 wt % and ≤75.0 wt % of units derived from butadiene, with regard to the total weight of polymer (c); and
polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

A further particularly preferred embodiment of the present invention relates to a polymer composition comprising:
(a) 40.0-70.0 wt % of poly(butylene terephthalate);
(b) 5.0-25.0 wt % of glass fibres;
(c) 10.0-25.0 wt % of a polymer comprising moieties derived from acrylonitrile, butadiene and styrene; and
(d) 1.0-10.0 wt % of a polymer comprising moieties derived from ethylene, methyl acrylate and glycidyl acrylate
with regard to the total weight of the polymer composition;
wherein
polymer (c) comprises ≥60.0 wt % and ≤75.0 wt % of units derived from butadiene, with regard to the total weight of polymer (c); and
polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

In yet another particular embodiment, the invention relates to a polymer composition comprising:
(a) 40.0-70.0 wt % of poly(butylene terephthalate);
(b) 5.0-25.0 wt % of glass fibres;
(c) 10.0-25.0 wt % of a polymer comprising moieties derived from acrylonitrile, butadiene and styrene; and
(d) 1.0-10.0 wt % of a polymer comprising moieties derived from ethylene, methyl (meth)acrylate and glycidyl (meth)acrylate
with regard to the total weight of the polymer composition;
wherein
the poly(butylene terephthalate) has an intrinsic viscosity of ≥0.50 dl/g and ≤2.50 dl/g as determined in accordance with ASTM D2857-95 (2007);
polymer (c) comprises ≥60.0 wt % and ≤75.0 wt % of units derived from butadiene, with regard to the total weight of polymer (c); and
polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

In a further particular embodiment, the present invention relates to a polymer composition comprising:
(a) 40.0-70.0 wt % of poly(butylene terephthalate);
(b) 5.0-25.0 wt % of glass fibres;
(c) 10.0-25.0 wt % of a polymer comprising moieties derived from acrylonitrile, butadiene and styrene; and
(d) 1.0-10.0 wt % of a polymer comprising moieties derived from ethylene, methyl acrylate and glycidyl acrylate
with regard to the total weight of the polymer composition;
wherein
the poly(butylene terephthalate) comprises ≥30.0 wt % and ≤70.0 wt % of a poly(butylene terephthalate) having an intrinsic viscosity of 0.50-1.00 dl/g and ≤30.0 wt % and ≤70.0 wt % of a poly(butylene terephthalate) having an intrinsic viscosity of 1.00-1.50 dl/g, as determined in accordance with ASTM D2857-95 (2007);

polymer (c) comprises ≥60.0 wt % and ≤75.0 wt % of units derived from butadiene, with regard to the total weight of polymer (c); and polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

In another further particular embodiment, the present invention relates to a polymer composition comprising:

(a) 40.0-70.0 wt % of poly(butylene terephthalate);
(b) 5.0-25.0 wt % of glass fibres;
(c) 10.0-25.0 wt % of a polymer comprising moieties derived from acrylonitrile, butadiene and styrene; and
(d) 1.0-10.0 wt % of a polymer comprising moieties derived from ethylene, methyl acrylate and glycidyl acrylate with regard to the total weight of the polymer composition;
wherein
the poly(butylene terephthalate) comprises ≥30.0 wt % and ≤70.0 wt % of a poly(butylene terephthalate) having an intrinsic viscosity of 0.50-1.00 dl/g and ≥30.0 wt % and ≤70.0 wt % of a poly(butylene terephthalate) having an intrinsic viscosity of 1.00-1.50 dl/g, as determined in accordance with ASTM D2857-95 (2007);

polymer (c) comprises ≥60.0 wt % and ≤75.0 wt % of units derived from butadiene, with regard to the total weight of polymer (c);

polymer (c) has an average particles size of ≥200 and ≤500 nm, as determined as the particle size D50 as determined in accordance with ISO 9276-2 (2014); and polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

The present invention also relates to articles produced using the polymer composition of the present invention. Such article may for example be an automotive part, such as a part of automotive fuel systems, including valves and ports used in fuel tanks, in-tank electrical connectors, and tube clips. Such articles may for example be produced via injection moulding.

The invention also relates to the use of such articles as automotive parts, in particular to the use of such articles in automotive parts that are exposed to fuels.

The invention will now be illustrated by the following non-limiting examples.

TABLE I

| | Materials |
|---|---|
| PBT1 | Poly(butylene terephthalate) having an intrinsic viscosity of 1.10 dl/g, grade Valox 315, obtainable from SABIC |
| PBT2 | Poly(butylene terephthalate) having an intrinsic viscosity of 0.66 dl/g, grade Valox 195, obtainable from SABIC |
| ABS | Acrylonitrile-butadiene-styrene graft copolymer, butadiene content 65 wt %, grade HRG SG24, obtainable from SABIC |
| GF | 13 MICRON PBT GLASS FIBER, CAS Reg. No. 65997-17-3, available as HP3770 from PPG industries INC. |
| IM | Ethylene-methyl acrylate-glycidyl methacrylate, grade Lotader AX8900, obtainable from Arkema |
| STAB | Stabiliser composition comprising: 48.8 wt % pentaerythritol tetra(3-laurylthiopropionate) (CAS reg. nr. 29598-76-3); 12.2 wt % 2-(2-hydroxy-3,5-dicumyl)benzotriazole (CAS reg. nr. 70321-86-7); 19.5 wt % octadecyl 3,5-di-tert-butyl-4-hydroxyphenylpropionate (CAS reg. nr. 2082-79-3); and 19.5 wt % bis(2,4-di-t-butylphenyl)pentaerythritol diphosphate (CAS reg. nr. 26741-53-7) |
| CB | Carbon black masterbatch comprising 25.0 wt % carbon black (CAS reg. nr. 1333-86-4) and 75.0 wt % PBT1 |

Using the formulations as presented in table I, a set of polymer compositions was prepared by melt blending of the formulations as presented in table II. The melt blending was performed in a 25 mm twin-screw melt extruder at a temperature of 260° C.

TABLE II

| Formulations for polymer compositions | | | | | |
|---|---|---|---|---|---|
| | Composition | | | | |
| | 1 | 2 | 3 | 4 (C) | 5 (C) |
| PBT1 | | | 24.47 | | |
| PBT2 | 58.95 | 48.95 | 24.48 | 68.95 | 48.95 |
| ABS | 20.00 | 20.00 | 20.00 | 20.00 | 25.00 |
| GF | 10.00 | 20.00 | 20.00 | | 20.00 |
| IM | 5.00 | 5.00 | 5.00 | 5.00 | |
| STAB | 2.05 | 2.05 | 2.05 | 2.05 | 2.05 |
| CB | 4.00 | 4.00 | 4.00 | 4.00 | 4.00 |

Compositions 4 and 5 are included for comparative purposes.

Using the polymer compositions as prepared by melt blending according to table II, a set of properties of the polymer compositions was determined. The properties are presented in table III.

TABLE III

Properties of polymer compositions

| | Composition | | | | |
|---|---|---|---|---|---|
| | 1 | 2 | 3 | 4 | 5 |
| Izod (duct) 23° C. | 233 (100) | 237 (100) | 304 (100) | 234 (0) | 181 (80) |
| Izod (duct) 0° C. | 162 (0) | 182 (100) | 221 (100) | 175 (0) | 138 (0) |
| Izod (duct) −20° C. | 128 (0) | 147 (0) | 166 (20) | 139 (0) | 125 (0) |
| Izod (duct) −40° C. | 115 (0) | 129 (0) | 138 (0) | 118 (0) | 101 (0) |
| MAI (duct) 23° C. | 18.8 (100) | 18.6 (80) | 21.0 (100) | | 19.1 (80) |
| MAI (duct) 0° | 16.9 (100) | 17.0 (80) | 20.4 (100) | | 18.7 (20) |
| MAI (duct) −20° C. | 14.2 (60) | 17.9 (100) | 20.4 (100) | | 17.2 (0) |
| MAI (duct) −40° C. | 7.3 (0) | 13.4 (0) | 16.2 (40) | | 13.1 (0) |
| TM | 3016 | 4798 | 5028 | 1378 | 5520 |
| TS yield | 45.5 | 61.6 | 63.2 | 24.8 | 64.7 |
| TE break | 8.14 | 4.74 | 5.24 | 122 | 3.9 |
| HDT | 134.4 | 172.2 | | 47.8 | 169.0 |

Wherein:

Izod relates to the Izod impact strength, determined in accordance with ASTM D256 (2010), notched samples, sample size 75×12.2×3.2 mm, determined at varying indicated sample temperature, presented in J/m, ductility of break in % presented in brackets;

MAI relates to multi-axial impact energy, determined in accordance with ASTM D3763 (2015), samples 3.2 mm thickness, speed 3.3 m/s, presented in J, ductility of break in % presented in brackets;

TM is the modulus of elasticity, determined in accordance with ASTM D638 (2014), speed 5 mm/min, presented in MPa;

TS yield is the tensile strength at yield, determined in accordance with ASTM D638 (2014), speed 5 mm/min, presented in MPa;

TE break is the tensile elongation at break, determined in accordance with ASTM D638 (2014), speed 5 mm/min, presented in %;

HDT is the heat deflection temperature as determined in accordance with accordance with ASTM D648 (2016) using bars of 6.4 by 12.7 mm cross-sectional diameter, a loading stress of 4.6 kg, a heating rate of 2.0° C./min, and a deflection at reading of 0.25 mm, presented in ° C.

The above presented data indicate that the polymer compositions according to the present invention present an improved balance of impact strength and mechanical properties.

To evaluate the chemical resistance of the polymer compositions, samples of compositions 2 and 3 in the form of injection moulded test bars for testing the TM, TS yield and TE break according to ASTM D638 (2014) were subjected to a variety of chemicals for a duration of 5000 hrs at a temperature of 60° C., upon which the TM, TS yield and TE break were determined, thereby obtaining data with regard to the retention of the tested properties upon exposure.

The chemicals that were used to test the chemical resistance are listed in table IV.

TABLE IV

Chemicals used for chemical resistance testing.

| | |
|---|---|
| Water | De-ionized water according to ASTM D1193 (1999), type III |
| CE10 | Mixture of 10 wt % ethanol (CAS reg. nr. 64-17-5), 45 wt % iso-octane (CAS reg. nr. 540-84-1) and 45 wt % toluene (CAS reg. nr. 106-88-3) |
| CM15 | Mixture of 15 wt % methanol (CAS reg. nr. 67-56-1), 42.5 wt % iso-octane (CAS reg. nr. 540-84-1) and 42.5 wt % toluene (CAS reg. nr. 106-88-3) |
| ENG CLT | Mixture of 40 wt % de-ionized water according to ASTM D1193 (1999), type III and 60 wt % ethanediol (CAS reg. nr. 107-21-1) |
| BRK FLD | Service Pro High Temperature Dot 3 Brake Fluid, obtainable from Penray, a mixture comprising 25 wt % diethylene glycol (CAS reg. nr. 111-46-6), 30 wt % triethylene glycol monobutyl ether (CAS reg. nr. 143-22-6), 20 wt % diethylene glycol monobutyl ether (CAS reg. nr. 112-34-5) and 10 wt % 2-(2-propoxyethoxy)ethanol (CAS reg. nr. 6881-94-3) |
| BAT ACID | Mixture of 50 wt % sulfuric acid (CAS reg. nr. 7664-93-9) and 50 wt % de-ionized water according to ASTM D1193 (1999), type III |
| NaCl | Mixture of 26.3 wt % sodium chloride (CAS reg. nr. 7647-14-5) dissolved in 73.7 wt % of de-ionized water according to ASTM D1193 (1999), type III |

TABLE V

Properties after exposure to chemicals

| | Composition | | | | | |
|---|---|---|---|---|---|---|
| | 2 | | | 3 | | |
| | | | Property | | | |
| Solvent exposure | TM | TS yield | TE break | TM | TS yield | TE break |
| Water | 4315 | 42.3 | 19.47 | 4580 | 52.0 | 2.31 |
| CE10 | 2380 | 33.9 | 37.50 | 3175 | 25.8 | 2.06 |
| CM15 | 2930 | 38.8 | 12.27 | 3355 | 22.2 | 0.90 |
| ENG CLT | 1900 | 36.3 | 66.27 | 4275 | 32.5 | 2.27 |

TABLE V-continued

Properties after exposure to chemicals

| | Composition | | | | | |
|---|---|---|---|---|---|---|
| | 2 | | | 3 | | |
| | Property | | | | | |
| Solvent exposure | TM | TS yield | TE break | TM | TS yield | TE break |
| BRK FLD | 2430 | 34.0 | 81.69 | 3265 | 27.5 | 3.28 |
| BAT ACID | | | | 4470 | 45.7 | 1.81 |
| NaCl | 4670 | 43.5 | 20.21 | 4915 | 62.5 | 3.05 |

From the above presented material properties it becomes evident that polymer compositions according to the present invention demonstrate desirably good chemical resistance.

The invention claimed is:

1. A polymer composition, consisting essentially of:
   (a) 40.0-70.0 wt % of poly(butylene terephthalate);
   (b) 5.0-25.0 wt % of glass fibres;
   (c) 10.0-25.0 wt % of a polymer comprising moieties derived from acrylonitrile, butadiene and styrene;
   (d) 1.0-10.0 wt % of a polymer comprising moieties derived from ethylene, methyl (meth)acrylate and glycidyl (meth)acrylate with regard to the total weight of the polymer composition; and
   (e) a stabilizer selected from an antioxidant, a UV stabilizer, or a heat stabilizer.

2. The polymer composition according to claim 1, wherein the poly(butylene terephthalate) (a) is a mixture of a first poly(butylene terephthalate) having an intrinsic viscosity of 0.50-0.80 dl/g and a second poly(butylene terephthalate) having an intrinsic viscosity of 1.00-1.50 dl/g.

3. The polymer composition according to claim 1, wherein the poly(butylene terephthalate) (a) is present in amount of 40.0-60.0 wt % with regard to the total weight of the polymer composition.

4. The polymer composition according to claim 1, wherein the glass fibres used in the production of the polymer composition have an average length of 3.0-15.0 mm and/or an average diameter of 6.0-20.0 μm.

5. The polymer composition according to claim 1, wherein the glass fibres (b) are present in an amount of 10.0-25.0 wt % with regard to the total weight of the polymer composition.

6. The polymer composition according to claim 1, wherein the polymer (c) comprises 40.0-70.0 wt % of moieties derived from butadiene with regard to the total weight of the polymer (c).

7. The polymer composition according to claim 1, wherein the polymer (c) has an average particle size of ≥200 and ≤500 nm as determined as the particle size $D_{50}$ as determined in accordance with ISO 9276-2 (2014).

8. The polymer composition according to claim 1, wherein the polymer (d) comprises 5.0-15.0 wt % of moieties derived from glycidyl (meth)acrylate, with regard to the total weight of the polymer (d).

9. The polymer composition according to claim 1, wherein the polymer (d) comprises 10.0-30.0 wt % of moieties derived from methyl (meth)acrylate, with regard to the total weight of the polymer (d).

10. The polymer composition according to claim 1, wherein the methyl (meth)acrylate is methyl acrylate and/or the glycidyl (meth)acrylate is glycidyl methacrylate.

11. An article comprising the polymer composition according to claim 1.

12. The article according to claim 11, wherein the article is a part of an automotive fuel system.

13. The article according to claim 11, wherein the article is an automotive part.

14. The article of claim 13, where the automotive part is exposed to fuels.

15. The polymer composition of claim 1, wherein
    the poly(butylene terephthalate) (a) is a mixture of a first poly(butylene terephthalate) having an intrinsic viscosity of 0.50-0.80 dl/g and a second poly(butylene terephthalate) having an intrinsic viscosity of 1.00-1.50 dl/g;
    glass fibres are present in an amount of 10.0-25.0 wt %, with regard to the total weight of the polymer composition;
    the polymer (c) comprises 40.0-70.0 wt % of moieties derived from butadiene with regard to the total weight of the polymer (c);
    the polymer (d) comprises 5.0-15.0 wt % of moieties derived from glycidyl (meth)acrylate, 10.0-30.0 wt % of moieties derived from methyl (meth)acrylate, each with regard to the total weight of the polymer (d).

16. The polymer composition of claim 15, wherein
    the glass fibres used in the production of the polymer composition have an average length of 3.0-15.0 mm and/or an average diameter of 6.0-20.0 μm; and
    the polymer (c) has an average particle size of ≥200 and ≤500 nm as determined as the particle size $D_{50}$ as determined in accordance with ISO 9276-2 (2014).

17. The polymer composition according to claim 1, consisting essentially of:
    (a) 40.0-60.0 wt % of poly(butylene terephthalate);
    (b) 10.0-20.0 wt % of glass fibres;
    (c) 15.0-25.0 wt % of a polymer comprising moieties derived from acrylonitrile, butadiene and styrene;
    (d) 3.0-10.0 wt % of a polymer comprising moieties derived from ethylene, methyl (meth)acrylate and glycidyl (meth)acrylate; and
    (e) the stabilizer, with regard to the total weight of the polymer composition.

18. The polymer composition of claim 17, wherein
    the poly(butylene terephthalate) has an intrinsic viscosity of ≥0.50 dl/g and ≤2.50 dl/g as determined in accordance with ASTM D2857-95 (2007);
    polymer (c) comprises ≥60.0 wt % and ≤75.0 wt % of units derived from butadiene, with regard to the total weight of polymer (c); and
    polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

19. The polymer composition of claim 17, wherein
    the poly(butylene terephthalate) comprises ≥30.0 wt % and ≤70.0 wt % of a poly(butylene terephthalate) having an intrinsic viscosity of 0.50-1.00 dl/g and ≥30.0 wt % and ≤70.0 wt % of a poly(butylene terephthalate) having an intrinsic viscosity of 1.00-1.50 dl/g, as determined in accordance with ASTM D2857-95 (2007);
    polymer (c) comprises ≥60.0 wt % and ≤75.0 wt % of units derived from butadiene, with regard to the total weight of polymer (c); and
    polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

20. The polymer composition of claim 17, wherein the poly(butylene terephthalate) comprises ≥30.0 wt % and ≤70.0 wt % of a poly(butylene terephthalate) having an intrinsic viscosity of 0.50-1.00 dl/g and ≥30.0 wt % and ≤70.0 wt % of a poly(butylene terephthalate) having an intrinsic viscosity of 1.00-1.50 dl/g, as determined in accordance with ASTM D2857-95 (2007);

polymer (c) comprises ≥60.0 wt % and ≤75.0 wt % of units derived from butadiene, with regard to the total weight of polymer (c);

polymer (c) has an average particles size of ≥200 and ≤500 nm, as determined as the particle size $D_{50}$ as determined in accordance with ISO 9276-2 (2014); and polymer (d) comprises ≥15.0 wt % and ≤30.0 wt % of moieties derived from methyl acrylate and ≥5.0 wt % and ≤10.0 wt % of moieties derived from glycidyl methacrylate, with regard to the total weight of polymer (d).

* * * * *